United States Patent
Xue et al.

[11] Patent Number: 5,807,642
[45] Date of Patent: *Sep. 15, 1998

[54] SOLID OXIDE FUEL CELL STACKS WITH BARIUM AND STRONTIUM CERAMIC BODIES

[76] Inventors: Liang An Xue, 39 Mara Rd., Lake Hiawatha, N.J. 07034; Jean Yamanis, 15 Redwood Rd., Morristown, N.J. 07690; Richard Donaldson, 10 Lakeview Trail, Denville, N.J. 07834

[ * ] Notice: This patent issued on a continued prosecution application filed under 37 CFR 1.53(d), and is subject to the twenty year patent term provisions of 35 U.S.C. 154(a)(2).

[21] Appl. No.: 699,753

[22] Filed: Aug. 20, 1996

Related U.S. Application Data

[60] Provisional application No. 60/006,997 Nov. 20, 1995.

[51] Int. Cl.⁶ ...................................... H01M 8/10
[52] U.S. Cl. ................................ 429/33; 429/27; 429/29; 429/30; 429/44; 429/45; 429/46
[58] Field of Search ..................... 501/137, 138; 429/27, 29, 30, 33, 45, 44, 46

[56] References Cited

U.S. PATENT DOCUMENTS

| | | | |
|---|---|---|---|
| 4,483,694 | 11/1984 | Takamura et al. | 427/126.4 |
| 4,487,755 | 12/1984 | Arendt | 423/598 |
| 4,610,968 | 9/1986 | Wada et al. | 501/137 |
| 4,610,970 | 9/1986 | Wada et al. | 501/137 |
| 4,677,083 | 6/1987 | Uedaira et al. | 501/137 |
| 4,983,839 | 1/1991 | Deb | 250/338.3 |
| 4,999,736 | 3/1991 | Kishi et al. | 361/321 |
| 4,999,737 | 3/1991 | Kishi et al. | 361/321 |
| 5,232,880 | 8/1993 | Wada et al. | 501/137 |
| 5,248,640 | 9/1993 | Sano et al. | 501/137 |
| 5,290,740 | 3/1994 | Abe et al. | 501/139 |
| 5,314,651 | 5/1994 | Kulwicki | 501/138 |
| 5,319,517 | 6/1994 | Nomura et al. | 501/137 |
| 5,378,663 | 1/1995 | Abe et al. | 501/32 |
| 5,427,988 | 6/1995 | Sengupta et al. | 501/137 |
| 5,486,491 | 1/1996 | Sengupta et al. | 501/137 |
| 5,510,305 | 4/1996 | Sano et al. | 501/138 |
| 5,549,983 | 8/1996 | Yamanis | 429/32 |
| 5,635,433 | 6/1997 | Sengupta | 501/137 |
| 5,635,434 | 6/1997 | Sengupta | 501/137 |

*Primary Examiner*—Bruce F. Bell
*Attorney, Agent, or Firm*—John R. Rafter

[57] ABSTRACT

A ceramic body based on barium and strontium titanates has a composition defined essentially by the formula $Ba_{1-x}Sr_xTiO_3$, where x ranges from 0 to 1. The ceramic body is chemically and dimensionally stable in solid oxide fuel cell (SOFC) operation environments, which encounter oxidizing and reducing atmospheres at temperatures as high as 1,000° C. In addition, the ceramic of which the body is comprised can be tailored to yield a ceramic in which the thermal expansion coefficient (CTE) is adjusted between $11.3 \times 10^{-6}/°C$. and $12.4 \times 10^{-6}/°C$. to match the CTE of the other SOFC materials, thereby avoiding the adverse effects of thermal stress. These features make the ceramic body especially suited for use as manifolds in SOFC stacks, or other non-electrical structural components, such as the inflow and outflow gas manifold materials, the stack housing, or other support structure or spacers in the stack, and the like.

15 Claims, 2 Drawing Sheets

SOLID OXIDE FUEL CELL STACKS WITH BARIUM AND STRONTIUM CERAMIC BODIES

CROSS REFERENCE TO RELATED APPLICATIONS

This application claims the benefit of U.S. Provisional application Ser. No. 60/006,997, Filed Nov. 20, 1995.

BACKGROUND OF THE INVENTION

1. Field of the Invention

This invention relates to solid oxide fuel cell (SOFC) materials and more particularly to ceramic bodies used as a manifold in SOFC stacks.

2. Description of the Prior Art

The solid oxide fuel cell has high potential for production of electrical energy from cheap fuels or by-product waste gas streams from the petrochemical and metallurgical industries. The potential of these fuel cells lies in the high efficiency of converting chemical to electrical energy and could find extensive applications in the domestic, commercial, defense, and aerospace sectors of the economy.

The solid oxide fuel cell is made of four major materials: (1) anode, usually made of a nickel-zirconia cermet; (2) electrolyte, made of a fully stabilized zirconia; (3) cathode, usually made of strontium-doped lanthanum manganite; and (4) interconnect, made of either doped lanthanum chromite or high temperature metal alloys. The adjacent anode, electrolyte, and cathode make up one cell, while the interconnect serves as an internal electrical connection between individual cells. The construction of the SOFC has been discussed in detail in a review paper by N. Minh, "Ceramic Fuel Cells," J. Am. Ceram. Soc., vol.73, pp.563–588, 1993. The operating temperature of SOFC may range from 800° to 1,000° C.

Each of the aforementioned SOFC materials has a rather high coefficient of thermal expansion (CTE). At 1,000° C., the average CTE of the anode ranges from 11.2 to 12.7×$10^{-6}$/°C., depending on the nickel content and the amount of other additives present therein. At the same temperature, the average coefficient of thermal expansion of the electrolyte is about 10×$10^{-6}$/°C. The average CTE of the cathode ranges from 11.7 to 12.4×$10^{-6}$/°C. for a strontium content ranging from 5 to 20 mole percent. The average CTE of lanthanum chromite doped with cobalt and calcium is about 11.4×$10^{-6}$/°C., while the average coefficient of thermal expansion of most high temperature metal alloys is considerably higher than 12×$10^{-6}$/°C. The electrolyte layer is usually very thin, e.g., a few micrometers thick, and the material compositions of the other materials can be chosen so that their coefficients of thermal expansion are reasonably matched. In these circumstances, the thermal expansion mismatch among the SOFC materials can be tailored to be relatively small. The effective average CTE of these materials as a whole can be tailored to range from about 11.5 to 12×$10^{-6}$/°C.

Another important material in a complete SOFC stack system is the material for the manifold, which provides the housing and the compartments for the fuel and oxidant gases to and from the SOFC stack (U.S. Pat. Nos. 4,476,196 and 4,476,197). The manifold material must be stable, both chemically and dimensionally, in both the oxidizing and the reducing atmospheres of the solid oxide fuel cell at high temperatures, e.g. 1,000° C. It must also have an average CTE ranging form 11.5 to 12×$10^{-6}$/°C. in order to avoid thermal expansion mismatch with the other SOFC materials. Stabilized zirconia or alumina can be used as manifold material but their relatively low CTE gives rise to large thermal expansion mismatch and causes problems in sealing the manifold to the stack. The use of high CTE metallic manifold materials causes similar problems. Accordingly, there is a need for a suitable SOFC manifold or other non-electrical material having a coefficient of thermal expansion which can be tailored to match the CTE's of the other SOFC materials.

SUMMARY OF THE INVENTION

The present invention provides a ceramic body having a composition consisting essentially of $Ba_{1-x}Sr_xTiO_3$, wherein x ranges from 0 to 1, the ceramic body being especially suited for use as non-electrical, structural parts in solid oxide fuel cell stacks. Such non-electrical, structural parts can comprise, for example, the inflow and outflow gas manifold materials, the stack housing, or other support structure or spacers in the stack.

In one embodiment, the present invention comprises a ceramic body which is a solid solution of barium titanate and strontium titanate having the chemical formula $Ba_{1-x}Sr_xTiO_3$, where x ranges from 0 to 1.

In another embodiment, the present invention provides a ceramic body that consists essentially of a composite of barium titanate, strontium titanate and a solid solution of the barium and strontium titanate phases, the average composition of the composite corresponding to the chemical formula $Ba_{1-x}Sr_xTiO_3$, where x ranges from 0 to 1.

In still another embodiment, the present invention provides a ceramic body of barium and strontium titanates wherein the ratio of the moles of (Ba+Sr) to the moles of Ti ranges from 0.95 to 1.05.

In a further embodiment, the present invention provides a ceramic body which is composed of barium and strontium titanates, and which contains other material additives that serve as modifiers of the coefficient of thermal expansion or as sintering/processing aids, the total amount of the additives being less than 20 percent by weight of the body. These additives may be oxide, boride, carbide, nitride, and fluoride materials. Said oxide additives may be oxides of one or more elements selected from the group consisting of beryllium, boron, magnesium, aluminum, silicon, calcium, scandium, vanadium, chromium, manganese, iron, cobalt, nickel, copper, zinc, gallium, yttrium, zirconium, niobium, molybdenum, hafnium, tantalum, lead, bismuth, and the lanthanum series.

In all of the embodiments described above, up to 25 mol % of (Ba+Sr) may be substituted by calcium. This substitution will yield embodiments with properties similar to those of the barium/strontium titanate materials, except that the lower end of the range of the coefficient of thermal expansion will be extended.

The ceramic body of the present invention is stable, both chemically and dimensionally, in both the oxidizing and the reducing atmospheres of the solid oxide fuel cells at temperatures as high as 1,000° C. Advantageously, the CTE of the ceramic body can be adjusted from 11.3 to 12.4×$10^{-6}$/°C. to closely match that of the other SOFC materials to avoid thermal stress in the stack caused by thermal expansion mismatch. Another benefit of the ceramic body of this invention is the low fabrication thereof. The manifold parts can be readily made by sintering of low cost raw materials. Each of the two main ingredients of the ceramic body, barium titanate and strontium titanate, is widely used as dielectric material in the capacitor industry. Another advantage of the ceramic body of this invention is its exceptionally good resistance to oxidation and corrosion. This oxidation and corrosion resistance is unmatched by previous metallic manifold materials.

BRIEF DESCRIPTION OF THE DRAWINGS

The invention will be more fully understood and further advantages will become apparent when reference is made to the following detailed description of the preferred embodiments of the invention and the accompanying drawings in which.

DETAILED DESCRIPTION OF THE PREFERRED EMBODIMENTS

The present invention provides non-electrical, structural ceramic bodies based on the solid solution of barium titanate and strontium titanate. These ceramic bodies have a composition defined essentially by the formula $Ba_{1-x}Sr_xTiO_3$, where x ranges from 0 to 1. The term "non-electrical, structural" is used to denote materials or parts which are needed in the construction of fuel cell stacks but are neither ionic nor electronic conductors. The $Ba_{1-x}Sr_xTiO_3$ composition belongs to the family of perovskite compounds, which is represented by the general formula $ABO_3$, where A denotes large cations such as Ca, Sr, and Ba which occupy the 12-coordinate 'A' site in the crystal structure, while B denotes small cations such as Ti and Zr which occupy the 6-coordinate 'B' site in the crystal structure. For the materials of the present invention, the A site is occupied by Ba and Sr and the B site is occupied by Ti. However, a fraction of the barium and/or strontium can be substituted by calcium yielding a perovskite material having Ba, Sr and Ca at the 'A' site. Incorporation of calcium will yield a material with similar properties as the barium/strontium titanate material with the exception of thermal expansion coefficient.

Figure 2:
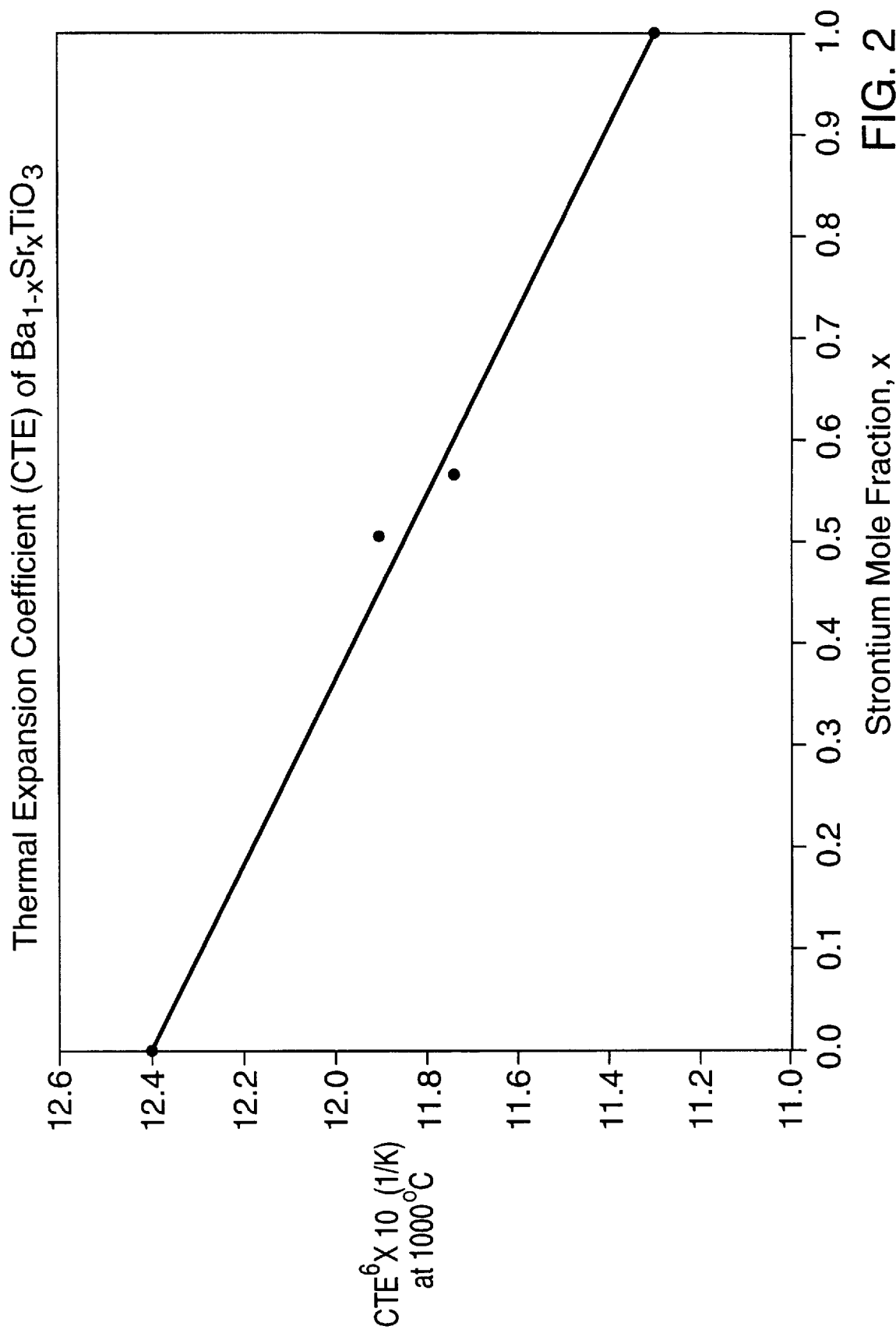
FIG. 2 is a graph showing the average thermal expansion coefficient of barium/strontium titanates at 1000° C. as function of the strontium content.

The $Ba_{1-x}Sr_xTiO_3$ material can be made using any powder preparation and sintering methods known in the field of ceramics, e.g., by solid-state reaction, or sol-gel, or simply by mixing an appropriate ratio of barium titanate and strontium titanate powders The composition of the $Ba_{1-x}Sr_xTiO_3$ material can be tailored to yield a material having a thermal expansion coefficient (CTE) ranging from $11.3 \times 10^{-6}/°C$. and $12.4 \times 10^{-6}/°C$. at 1,000° C. to match the CTE's of the other solid oxide fuel cell materials and, thus, to eliminate thermal stress. The low CTE value in the aforementioned range corresponds to high strontium content in the ceramic body, while the high value corresponds to low strontium content. Indeed, the CTE of the said ceramic body is inversely proportional to the strontium mole fraction, as shown in FIG. 2, and this relationship is the simple rule of mixtures, i.e., the CTE of the solid solution is a linear function of the CTE's of pure barium titanate and strontium titanate materials. The lower limit in the range of thermal expansion coefficient of the ceramic body of the present invention may be extended by the fractional substitution of barium and/or strontium with calcium. Other additives can also be added to the said material as CTE modifiers to further optimize the CTE value and/or as sintering/processing aids to facilitate the sintering/processing of the ceramic bodies.

Figure 1:
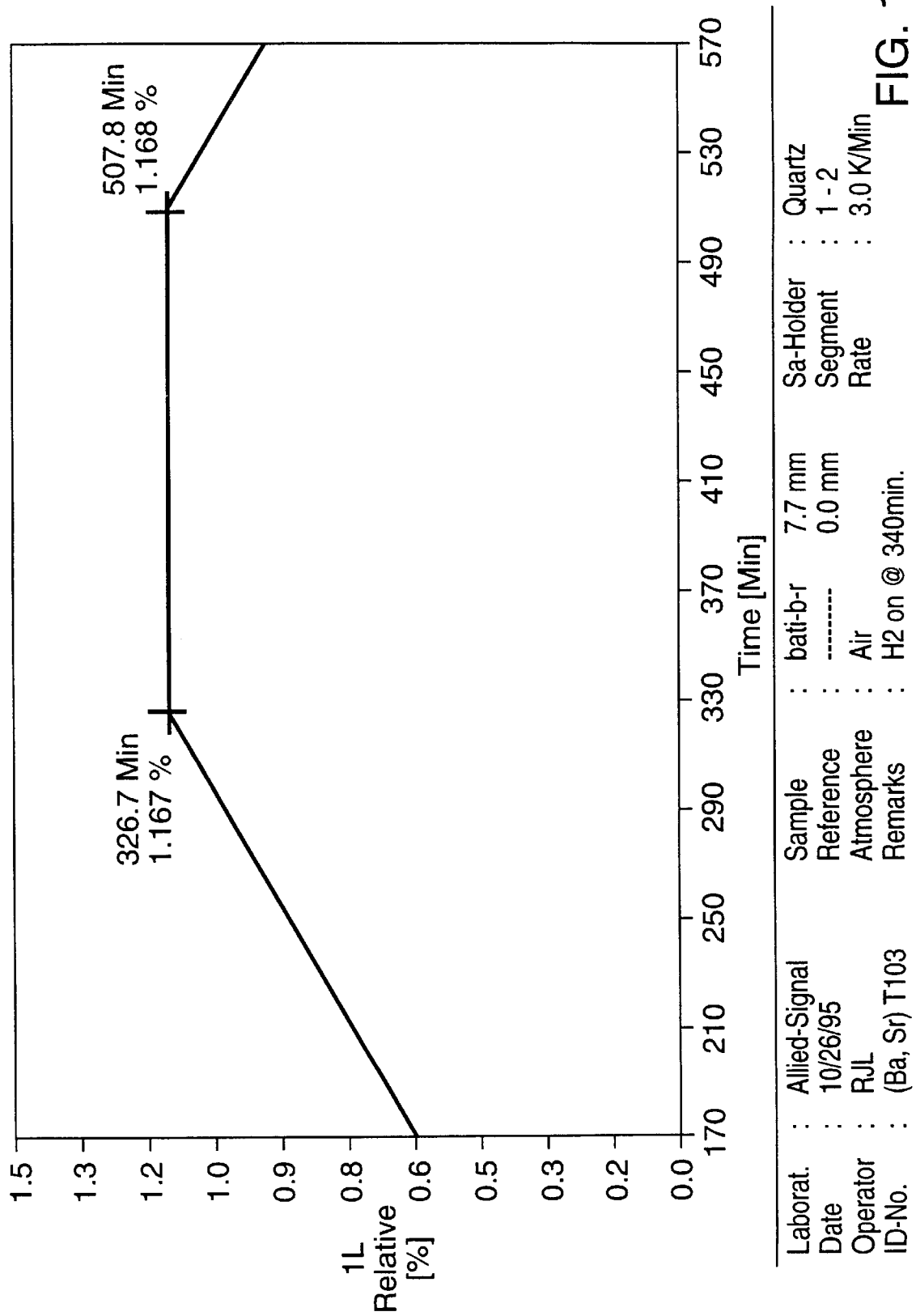
FIG. 1 is a dilatometry trace depicting the dimensional behavior of $Ba_{0.5}Sr_{0.5}TiO_3$ when it is exposed to hydrogen in a reducing atmosphere, at 1000° C.

One of the other important properties of the $Ba_{1-x}Sr_xTiO_3$ material is its stability under either oxidizing or reducing atmospheres at high temperatures, e.g. 1,000° C., which are typical conditions for solid oxide fuel cells. The stability of the material refers to both chemical stability, i.e., the composition of the material will not change, and dimensional stability, i.e., the material will essentially neither contract or expand, under either oxidizing or reducing atmospheres. FIG. 1 shows that a material, having the average composition $Ba_{0.5}Sr_{0.5}TiO_3$, does not expand when it is exposed to hydrogen, i.e., a reducing atmosphere.

In another embodiment, the present invention provides for the ceramic body to be a composite material. If the material is prepared starting from individual ingredients and the sintering/reaction temperatures and time used are not sufficient for the reaction and diffusion to complete, then the final ceramic body will be a composite of barium titanate, strontium titanate and a solid solution of the barium and strontium titanate phases. This, however, will essentially not affect the thermal expansion behavior and the stability of the said material. As in the case of the complete solid solution, the CTE of the composite closely follows the simple rule of mixtures based on the CTE's of barium titanate and strontium titanate, and should be approximately the same as the CTE of the solid solution.

The stability of the composite is as good as the stability of the least stable component which, in the materials concerned in the present invention, would be barium titanate. However, the barium titanate is sufficiently stable for solid oxide fuel cell applications.

The present invention provides for non-stoichiometric compositions for the barium and strontium titanate bodies. This non-stoichiometry is specified by the variation in the ratio of the moles of (Ba+Sr) to the moles of Ti, said ratio ranging from 0.95 to 1.05. The non-stoichiometric compositions essentially result in a composite containing minor phases of BaO, SrO, or $TiO_2$, because the solubility of these phases in barium and strontium titanate is fairly low, especially for BaO and SrO. However, the properties, including the thermal expansion coefficient, of these ceramic bodies are very similar to the properties of the stoichiometric materials.

Likewise, the addition of additives can easily produce a composite body. The total amount of said additives should be less than 20 percent by weight of the body. The said additives can be oxides, borides, carbides, nitrides, and fluorides. Oxides suitable for this purpose may contain one or more elements selected from the group consisting of beryllium, boron, magnesium, aluminum, silicon, calcium, scandium, vanadium, chromium, manganese, iron, cobalt, nickel, copper, zinc, gallium, yttrium, zirconium, niobium, molybdenum, hafnium, tantalum, lead, bismuth, and the lanthanum series.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

Strontium titanate powder was die-pressed to produce compacted green parts. The parts were sintered in air to 1500° C. for 2 hours to a high density with closed porosity. The CTE value as obtained by dilatometer measurement was $11.3 \times 10^{-6}/°C$. at 1000° C.

EXAMPLE 2

Barium titanate powder was die-pressed to produce compacted green parts. The parts were sintered in air to 1350° C. for 2 hours to a high density with closed porosity. The CTE value obtained at 1000° C. was $12.4 \times 10^{-6}/°C$.

EXAMPLE 3

Preparation of a solid solution of barium titanate and strontium titanate tape having a nominal formula of $Ba_{0.44}Sr_{0.56}O_3$: 50.00 grams barium titanate powder and 50.00 grams strontium titanate powder were mixed with 10.13 grams polyvinyl butyral (a binder), 10.13 grams butyl benzyl phthalate (a plasticizer), and 81.00 grams methanol. After drying the batch was then rolled by a calendering mill to make tapes of ~1 mm thick. Samples cut from the tapes were then sintered at 1350° C. for 1 hour to closed porosity. The CTE value of this material obtained at 1,000° C. was $11.74 \times 10^{-6}/°C$.

EXAMPLE 4

A sample of barium titanate and strontium titanate solid solution having a nominal formula of $Ba_{0.5}Sr_{0.5}O_3$ was prepared using the same procedure as used in Example 3. This batch started with 114.38 grams barium titanate and 90.00 grams strontium titanate, 22.20 grams polyvinyl butyral, 22.20 grams butyl benzyl phthalate, and 177.60 grams methanol. After sintering, the CTE value of this material obtained at 1,000° C. was $11.9 \times 10^{-6}/°C$. FIG. 1 shows a dilatometer trace of this material at 1000° C. in two different atmosphere. The material was first heated in air to 1000° C. and then held at the temperature for 15 minutes. After that, the atmosphere was switched to hydrogen and the temperature was held constant for several hours before cooling down. FIG. 1 demonstrates that there is negligible (only about $10^{-5}$) dimensional change in the material upon exposure to hydrogen from air, and that the material is stable in hydrogen atmosphere.

The preparation procedures for other compositions were similar but the barium content in the solid solution varied between 0 and 100%, producing a corresponding adjustable CTE from $11.3 \times 10^{-6}/°C$. to $12.4 \times 10^{-6}/°C$. at 1,000° C. The CTE values of the compositions in Examples 1 through 4 are plotted in FIG. 2.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A solid oxide fuel cell stack capable of operating at temperatures in excess of 1000° C., said solid oxide fuel cell stack having component parts exhibiting a coefficient of thermal expansion in the range of $11.2 \times 10^{-6}/°C$. to $12.7 \times 10^{-6}/°C$., said solid oxide fuel cell stack including a ceramic body having a composition consisting essentially of $Ba_{1-x}Sr_xTiO_3$, wherein x ranges from 0 to 1, and barium and strontium concentration of said ceramic body being adjusted such that the coefficient of thermal expansion of the ceramic body is within the range from $11.3 \times 10^{-6}/°C$. to $12.4 \times 10^{-6}/°C$. to minimize thermal stress between the body and other component parts of the solid oxide fuel cell.

2. A solid oxide fuel cell stack as recited by claim 1, wherein up to 25 mol % of (Ba+Sr) is substituted by calcium in the ceramic body to extend the range of adjustment of the coefficient of thermal expansion, wherein the ratio of barium, strontium, and calcium may be varied to adjust the coefficient of thermal expansion within the range from $11.3 \times 10^{-6}/°C$. to $12.4 \times 10^{-6}/°C$.

3. A solid oxide fuel cell stack as recited by claim 2, wherein said ceramic body consists essentially of a solid solution of barium and strontium titanates.

4. A solid oxide fuel cell stack as recited by claim 2, wherein said ceramic body consists essentially of a composite of barium titanate, strontium titanate, and the solid solution of barium and strontium titanates.

5. A solid oxide fuel cell stack as recited by claim 2, wherein the ratio of the moles of (Ba+Sr) to the moles of Ti in the ceramic body ranges from 0.95 to 1.05.

6. A solid oxide fuel cell stack as recited by claim 2, said ceramic body further containing one or more additives that serve as modifiers of the coefficient of thermal expansion or as sintering/processing aids, the total amount of said additives being less than 20 weight percent of the material.

7. A solid oxide fuel cell stack as recited by claim 6, wherein said additives to said ceramic body are oxides, borides, carbides, nitrides, and fluorides.

8. A solid oxide fuel cell stack as recited by claim 6, wherein said additives to said ceramic body are the oxides of one or more elements selected from the group consisting of beryllium, boron, magnesium, aluminum, silicon, calcium, scandium, vanadium, chromium, manganese, iron, cobalt, nickel, copper, zinc, gallium, yttrium, zirconium, niobium, molybdenum, hafnium, tantalum, lead, bismuth, and the lanthanum series.

9. A solid oxide fuel cell stack as recited by claim 1, wherein said ceramic body comprises a solid solution of barium and strontium titanates.

10. A solid oxide fuel cell stack as recited by claim 1, wherein said ceramic body consists essentially of a composite of barium titanate, strontium titanate, and the solid solution of barium and strontium titanates.

11. A solid oxide fuel cell stack as recited by claim 1, wherein the ratio of the moles of (Ba+Sr) to the moles of Ti in the ceramic body ranges from 0.95 to 1.05.

12. A solid oxide fuel cell stack as recited by claim 1, said ceramic body further containing one or more additives that serve as modifiers of the coefficient of thermal expansion or as sintering/processing aids, the total amount of said additives being less than 20 percent by weight of said ceramic body.

13. A solid oxide fuel cell stack as recited by claim 12, wherein said additives to said ceramic body are oxides, borides, carbides, nitrides, and fluorides.

14. A solid oxide fuel cell stack as recited by claim 12, wherein said additives to said ceramic body are the oxides of one or more elements selected from the group consisting of beryllium, boron, magnesium, aluminum, silicon, calcium, scandium, vanadium, chromium, manganese, iron, cobalt, nickel, copper, zinc, gallium, yttrium, zirconium, niobium, molybdenum, hafnium, tantalum, lead, bismuth, and the lanthanum series.

15. The solid oxide fuel cell stack capable of operating at temperatures in excess of 1000° C. of claim 1, wherein said solid oxide fuel cell stack component is a fuel cell manifold for supplying gas to said fuel cell stack.

* * * * *